US005560093A

United States Patent [19]

Hutton et al.

[11] Patent Number: 5,560,093

[45] Date of Patent: Oct. 1, 1996

[54] METHOD FOR POSTING PUBLIC NOTICES

[76] Inventors: Stanley C. Hutton, 80 Vanscoy Road, Winnipeg, Manitoba, Canada, R3R 1H3; Edward Setek, 55 Chase Drive, Winnipeg, Manitoba, Canada, R2E 0H6; John A. Robson, 765 Pardale Street, Winnipeg, Manitoba, Canada, R2Y 0X5

[21] Appl. No.: 372,673

[22] Filed: Jan. 17, 1995

Related U.S. Application Data

[63] Continuation-in-part of Ser. No. 60,987, May 14, 1993, abandoned.

[51] Int. Cl.[6] .......... B23P 11/00

[52] U.S. Cl. .......... 29/432; 40/607; 40/611

[58] Field of Search .......... 40/605, 606, 607, 40/611; 29/432, 455.1, 525.01

[56] References Cited

U.S. PATENT DOCUMENTS

| | | | |
|---|---|---|---|
| 3,449,848 | 6/1969 | Howell . | |
| 3,928,930 | 12/1975 | Attwood | 40/607 |
| 3,986,284 | 10/1976 | Plantinea . | |
| 4,300,299 | 11/1981 | Batky et al. | 40/607 |
| 4,329,801 | 5/1982 | Clavsen . | |
| 4,454,671 | 6/1984 | Morgenstern | 40/607 |
| 4,604,820 | 8/1986 | Edman . | |
| 4,608,773 | 9/1986 | White . | |
| 4,742,633 | 5/1988 | Snediker . | |
| 4,771,560 | 9/1988 | Richards . | |
| 5,038,506 | 8/1991 | Liljeqvist et al. . | |
| 5,116,204 | 5/1992 | Power et al. | 40/607 |

*Primary Examiner*—David P. Bryant

*Attorney, Agent, or Firm*—Adrian D. Battison; Murray E. Thrift

[57] ABSTRACT

Apparatus for posting notices comprises a sleeve member which is attached around a conventional utility pole such as a lamp standard. The sleeve member has a cross section, general polygonal, to closely surround the outside surface of the post at a position spaced from the ground for reading of notices posted on the sleeve member by the public. The sleeve member is attached by a pair of clamping bands at the top and bottom and has projecting rings at the top, center and bottom supporting the inside surface of the sleeve member away from the outside surface of the post to allow staples to pass through the paper notice, through the plastics material of the sleeve member and into the space between the metal post and the sleeve member.

16 Claims, 6 Drawing Sheets

METHOD FOR POSTING PUBLIC NOTICES

This application is a continuation-in-part of application Ser. No. 08/060,987, filed May 14, 1993, now abandoned.

This invention relates to a method for controlling the posting of public notices on city streets and the like.

In most cities members of the public often post notices of various events and other information on available surfaces without regard to whether those surfaces are suitable, are damages or are owned by persons who do not wish to have the notices posted. In many cases the posting of notices can become so wide spread that it leads to a very unattractive appearance of used and tattered notices since there is little control.

Many cities have been attempting to prohibit posting of notices on city property such as lamp standards, walls and fences but there has been a difficulty in enforcing such regulations since they infringe upon the rights of the individual. A compromise position is therefore proposed in which the city provides specific surfaces or apparatus for receiving the posting of public notices thus allowing the city to regulate or prohibit the posting of notices on other surfaces. Attempts have been made therefore to develop, at reasonable cost, a structure which can be mounted in the street to enable the posting of public notices by various members of the public. These devices include specially designed cylindrical towers which provide a relatively large surface on which the notices may be posted. However these devices are relatively expensive and require a relatively large area around the structure in the form of a plaza or traffic free zone to accommodate the structure without cluttering walkways.

At the present time therefore it is believed that little is available for use by city governments for providing such notice posting surfaces.

SUMMARY OF THE INVENTION

It is one object of the present invention to provide a method for controlling the posting of public notices which includes an apparatus of a type which can be manufactured relatively cheaply, can be installed quickly and easily and does not require large amounts of area for installation of the surfaces.

According to the invention, therefore, there is provided a method of displaying public notices on a receptacle therefor, the method comprising; providing a pole mounted on a ground surface and extending upwardly therefrom; mounting on the pole a molded plastic sleeve member having a sleeve wall surrounding the pole, an upper end and a lower end, the sleeve wall being formed of a plastics material of a character which can be penetrated by a staple and having an outer surface facing outwardly of the pole and an inner surface facing the pole; exposing the outer surface of the sleeve wall as an outer surface of the receptacle; attaching the sleeve member to the pole at a height such that the lower end is spaced from the ground; holding the sleeve wall fixed against longitudinal and rotational movement relative to the pole; and causing members of the public to apply a plurality of public notices formed of paper at various locations around the sleeve wall, at least some of the notices being attached to the outer surface of the sleeve member by at least one staple engaged through the notice into the sleeve wall.

Preferably the sleeve defines an inside surface which has a cross section closely following the outside surface of the pole. Often tills is polygonal. In addition the inside surface preferably has inwardly projecting spacer members for engaging the outside surface of the pole so as to haul the main body of the sleeve spaced at a slight distance away from the outside surface of the pole. This allows the attachment of notices using a stapler which engages through the notice and through the molded plastic material of the sleeve for the ends of the staple to be received in the space between the sleeve and the metal pole. Preferably the sleeve is attached by a pair of bands clamping around the sleeve at the top and bottom with the bands received in an indentation in the sleeve, that indentation providing the projecting spacer members on the inside surface to hold the remainder of the sleeve body away from the surface of the pole.

One embodiment of the invention will now be described in conjunction with the accompanying drawings in which:

DETAILED DESCRIPTION

Figure 5:
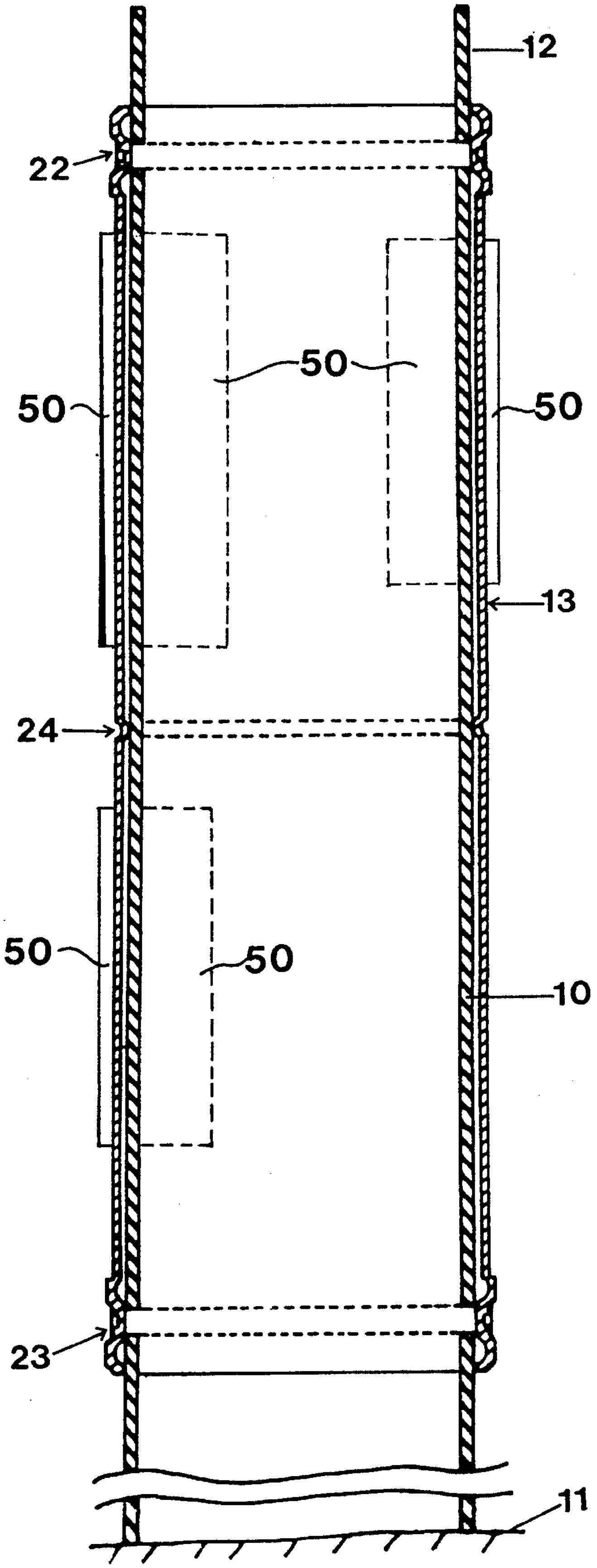
FIG. 5 is a longitudinal cross sectional view of the apparatus including the utility pole.

A utility pole is shown in FIG. 5 in cross section and is comprised of post 10 mounted on a ground surface 11 and extending upwardly therefrom. The utility pole can be of various different types including lamp standards, traffic light support posts, electricity poles and the like. The commonly used lamp standard is formed as a metal tube which is of octagonal or other polygonal cross section. This defines an outer surface 12 of the post 10. In many cases the post tapers inwardly toward the top for structural reasons. The area readily accessible for posting or reading is in the area from approximately three feet from the ground and extending upwardly to approximately seven feet from the ground which is the area in which posting of notices is desirable for easiest visibility.

In this area is mounted a sleeve member 13 for attachment of notices to the post 10. The sleeve member 13 thus defines a generally cylindrical area of the post on which notices can be attached leaving the remainder of the post free from such surfaces. In this way the city can limit the posting of notices to the surface which is specifically provided and is the outside surface of the sleeve member and can legislate that notices shall not be posted elsewhere.

Figure 1:
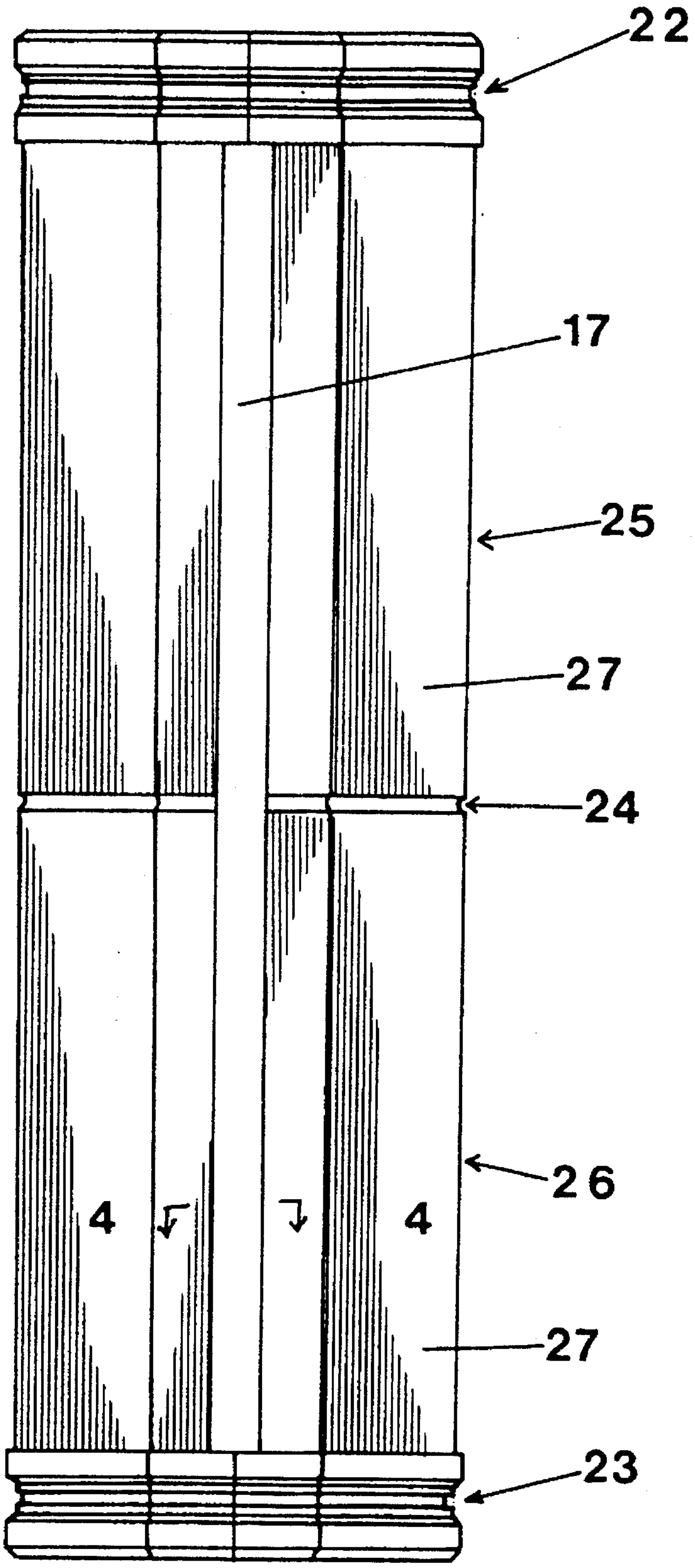
FIG. 1 is a rear elevational view of the apparatus according to the present invention.
Figure 2:
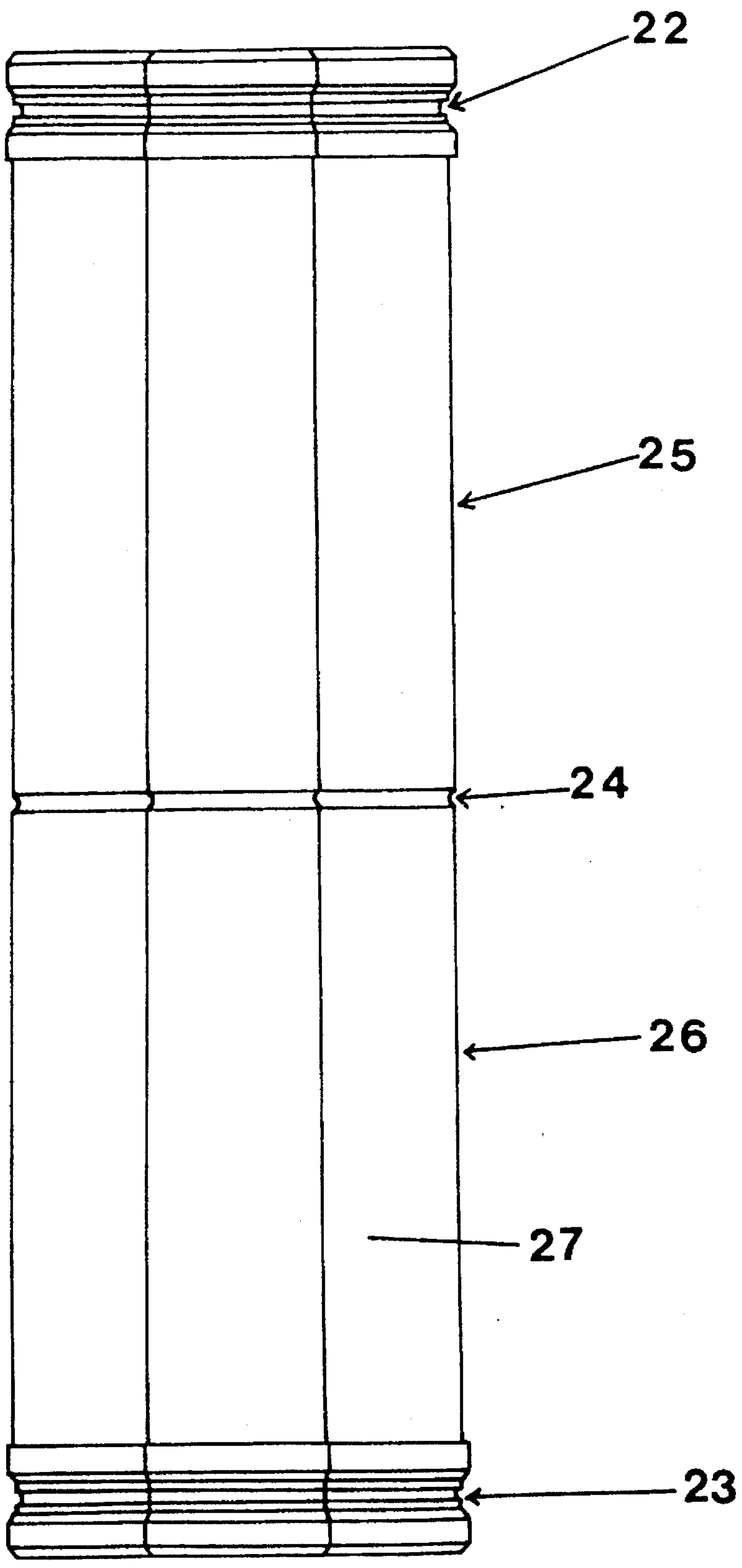
FIG. 2 is a front elevational view of the apparatus of FIG. 1.
Figure 3:
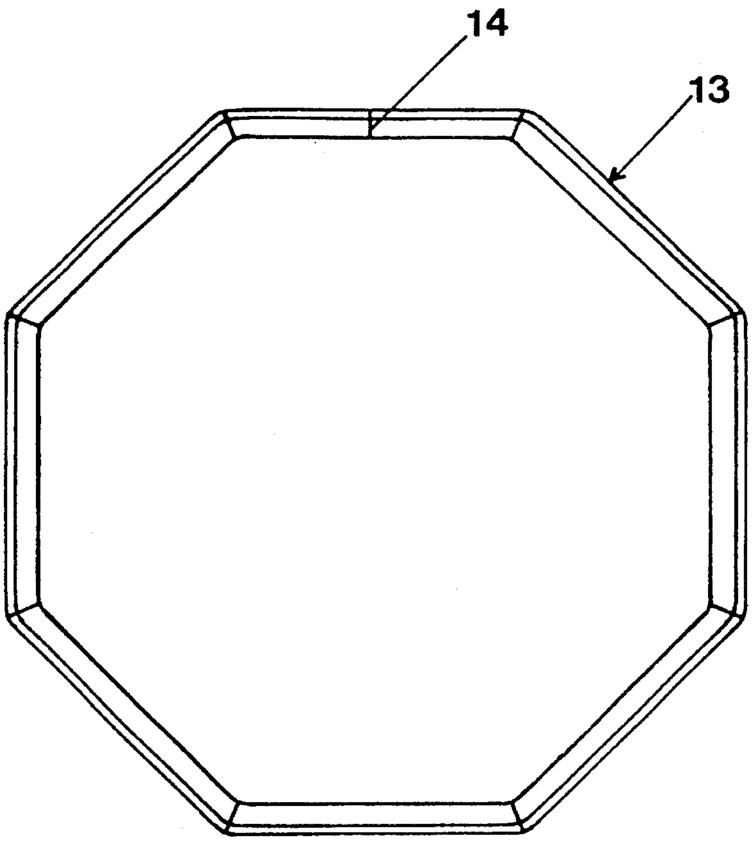
FIG. 3 is a top plan view of the apparatus, the bottom plan view being identical.
Figure 4:
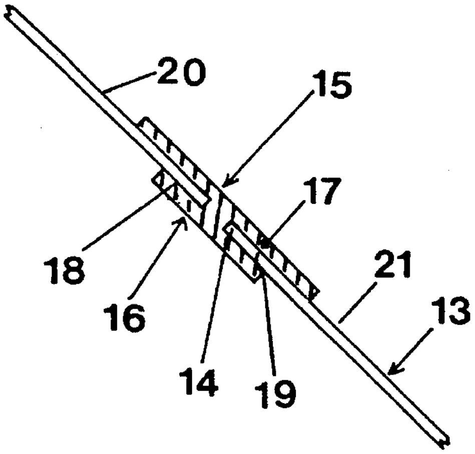
FIG. 4 is a cross sectional view along the lines 4—4 of FIG. 1.

The sleeve member is formed of a molded plastics material to form a cylindrical sleeve of polygonal cross section as best shown in FIG. 3 with a slit 14 along one side face of the polygonal. The slit 14 extends along the full length of the sleeve member so that the sleeve member can be opened by flexing to allow the slit to form an opening sufficiently large to wrap the sleeve member around the post and then to close by elasticity around the post thus basically closing the slit 14. A H-shaped coupling 15 is provided with an inside flange 16 and an outside flange 17 defining a pair of slots 18 and 19 into which the respective edges 20 and 21 of the sleeve member engage at the slit 14. This provides a band longitudinally of the sleeve member of the outside surface as indicated at 17 in FIG. 1.

Figure 6:
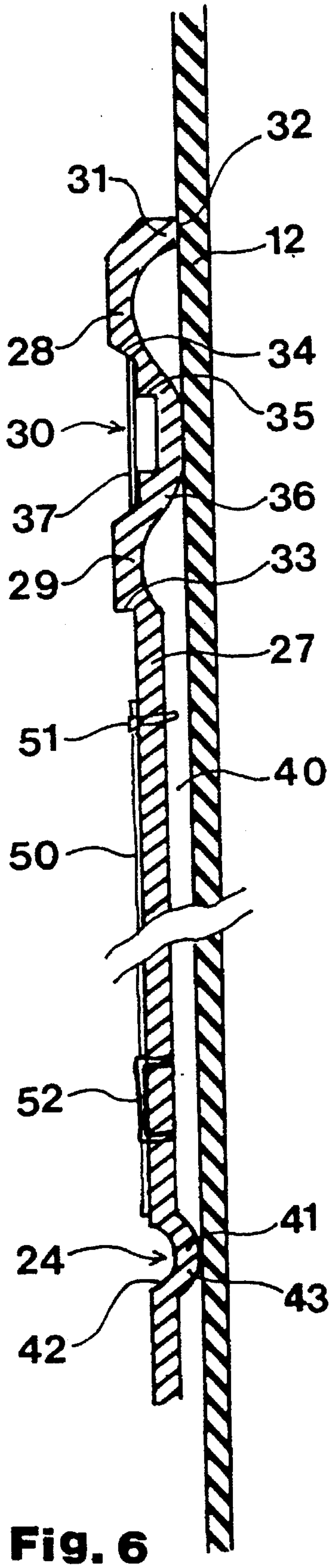
FIG. 6 is a part cross sectional view of the arrangement shown in FIG. 5 on an enlarged scale showing the attachment of a notice.

The sleeve member further includes an upper attachment ring 22, a lower attachment ring 23 and a central spacer ring 24. Each of these rings surrounds the sleeve member and thus surrounds the post. In between each of the rings, the sleeve member simply forms smooth panels arranged at the required angle to define the necessary polygonal shape to closely surround the outside surface of the post. The central spacer ring 24 thus divides the main body of the sleeve member into an upper half 25 and a lower half 26 each of which is made up of 8 panels 27. The upper and lower rings 23 are substantially identical and the cross section of one is best shown in FIG. 6 and is also visible in FIG. 5. Each of the rings comprises a first rib portion 28 and a second rib portion 29 which are spaced by an intervening recess 30. Above the rib portion 28 is provided an in turned flange 31 which extends from the rib inwardly to an inner edge 32 lying closely adjacent or in contact with the outside surface 12 of the post. The second rib portion 29 defines a shoulder 33 which separates the second rib portion from the main body defined by the panel 27. The recess portion 30 includes a first recess 34 of a width substantially equal to the full width of the recess portion and a second stepped recess 35 which is narrower with which it extends further inwardly toward the outside surface 12. These recesses define an inner projecting portion on the inside surface of the sleeve member which directly contact the outside surface 12 of the post. The larger recess 34 receives a band 37 of a suitable strapping material which is wrapped around the sleeve member within the recess and acts to tightly clamp the projecting portion 36 into contact with the outside surface of the post.

The second rib portion 29 extends away from the outside surface 12 and thus supports the main body panel 27 at a position spaced away from the outside surface to define a space therebetween indicated at 40.

The central spacer ring 24 defines an indented portion 41 having a recess 42 on the outside surface and thus a projecting portion 43 on the inside surface. The projecting portion 43 engages the outside surface 12 of the post and again thus supports the main body panel 27 at a position spaced from the outside surface of the post.

The sleeve member is thus attached to the post by the clamping bands 37 located in the recess in the top and bottom rings. The bands can be of a contrasting colour to provide an attractive appearance. The bands fill the recess in the outside surface of the sleeve member and the sides of the recess are shaped to provide a self centering effect on the band in the recess. The in turned flange 31 contacting the outside surface of the post prevents material from entering into the area behind the sleeve member and provides an attractive appearance of the sleeve member on the post. The body is slightly tapered to follow the shape of the post. The end wall forming the flange 31 is manufactured without an opening so that the opening can be cut with a template to match the dimensions of the post.

As the panels 27 are supported away from the outside surface of the post, paper notices 50 are attached to the sleeve member by staples 51 and 52 of a conventional stapler which are punched through the paper, through the wall of the sleeve member and into the area between the sleeve member and the post. The spacing is sufficient to receive the ends of the staples with little or no in turned clamping action of the ends. Thus the staples can be later readily removed with a simple lifting tool. Thus the public, when properly educated to the use of the device, can readily and effectively attach notices, posters and the like using staples so that they remain properly attached and providing a relatively neat and tidy appearance. When the relevance of the notice is passed, it can be covered up by a new or current notice or the notice torn away and a current notice applied, The sleeve member is thus made available for members of the public to apply the notices at various locations around the sleeve member at their discretion. The use of the sleeve member however control the posting of public notices by limiting it to the particular areas defined by the sleeve members and allowing the legislation to prevent posting at other non-allowed areas.

The sleeve is molded integrally from suitable plastics material and generally it will have a length of the order of 28 inches and a thickness of the order of ⅛" over the panels. Such a body can be formed by a rotational molding or by injection molding depending upon the volumes required and can be formed from a plastics material which has sufficient flexibility to allow the clamping action and to allow the penetration by the staples without cracking or splitting. Such a material may be polyethylene which can be readily molded by injection or rotational molding techniques and is non-transparent so that it does not expose the pole inside the sleeve and so that it provides an attractive outside appearance. Transparent materials such as acrylic or polycarbonate are unsuitable as they are generally too brittle to resist cracking when repeatedly punched by staples. A sleeve of-the above length can be applied between four and six feet from the ground, or if a longer posting length is required, two such sleeves can be attached end to end to cover the area seven feet to three feet.

Figure 7:
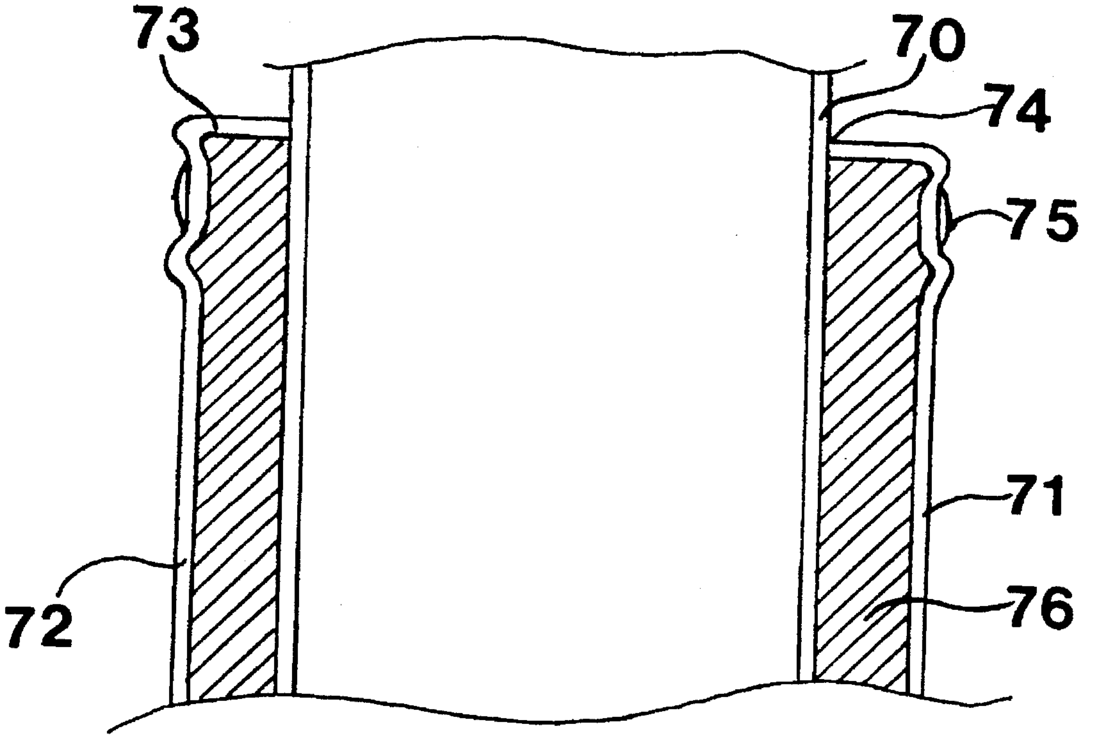
FIG. 7 is a part cross-sectional view of a second embodiment according to the invention.

A second embodiment is shown in FIG. 7 which includes a pole 70 and a sleeve 71. The sleeve is of a similar shape to that previously described in that it includes a peripheral wall 72 and top and bottom end walls 73 and is formed by rotational molding. The sleeve has a slit as a previously described and is connected at the slit by a H clip as previously described when wrapped around the pole 70. In FIG. 7 is only shown the top part of the sleeve but it will be appreciated that the bottom part is similarly shaped and of course inverted relative to the top part.

In the embodiment shown in FIG. 7, the sleeve has a peripheral wall of a diameter significantly greater than that of the pole 70. In this way the sleeve can accommodate different shapes and sizes of pole. Thus the end wall 73 is cut with an opening 74 which is shaped to match the specific pole 70 with which the sleeve is to be used. The remainder of the wall 73 remains in place and surrounds the pole with the inner edge thereof at the opening 74 in contact with the pole. The sleeve is attached or coupled around the post by a band 75 as previously described within a recess at the upper part of the sleeve adjacent the wall 73 and a similar band (not shown) within a recess adjacent the bottom wall 73.

In order to provide rigidity of the peripheral wall for receiving posted notices thereon, the space between the outside of the pole 70 and the inside surface of the sleeve is filled with a foam material 76 which has sufficient rigidity to hold the spacing between the pole and the wall 72 substantially constant. The foamed spacing material 76 can be foamed in place after the sleeve is clamped around the pole. Alternatively previously formed elements of a foamed material can be inserted around the pole after the sleeve is attached and before the sleeve is closed by the application of the H clip and the bands.

The fact that the sleeve is now spaced away from the post allows the sleeve to be shaped differently from the cross section of the post so the sleeve can be cylindrical of circular cross section to accommodate circular or polygonal posts. Alternatively the sleeve can again be of polygonal cross section matching the conventional octagonal cross section of the conventional posts.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of displaying public notices comprising:

providing a pole mounted on a ground surface and extending upwardly therefrom;

providing a generally cylindrical, substantially rigid, molded plastic sleeve member including an upper end, a lower end, and a sleeve wall having an inner surface and an outer surface, the upper and lower ends each having an opening therein to allow passage of the pole therethrough;

placing the sleeve member around the pole with the lower end thereof at a height which is spaced from the ground surface, such that the pole extends through the openings in the upper and lower ends of the sleeve member, and the sleeve wall surrounds the pole with the outer surface thereof facing outwardly of the pole;

attaching the sleeve member to the pole such that the sleeve member is fixed against longitudinal and rotational movement relative to the pole; and attaching a plurality of paper sheets containing public notices thereon at various locations on the outer surface of the sleeve wall, at least some of the sheets being attached by staples which penetrate through the sheets and into the sleeve wall.

2. The method according to claim 1 wherein the pole has a cross section which is substantially constant along the length of the sleeve member, and the inner surface of the sleeve wall defines an internal shape closely resembling the cross section of the pole.

3. The method according to claim 2 wherein the cross section of the pole is polygonal.

4. The method according to claim 1 wherein the sleeve member is slit longitudinally so as to allow the sleeve member to be opened at the slit and wherein the steps of placing the sleeve member around the pole and attaching the sleeve member to the pole comprise opening the sleeve member at the slit, placing the opened sleeve member around the pole, and engaging a plurality of bands around the sleeve member to clamp the sleeve member to the pole.

5. The method according to claim 4 further comprising inserting a coupling clip which is H-shaped in cross section within the slit.

6. A method of displaying public notices comprising:

providing a pole mounted on a ground surface and extending upwardly therefrom, the pole having an outer surface;

providing a generally cylindrical, substantially rigid, non-transparent, molded plastic sleeve member including an upper end, a lower end, and a sleeve wall having an inner surface and an outer surface, the upper and lower ends each having an opening therein to allow passage of the pole therethrough;

placing the sleeve member around the pole with the lower end thereof at a height which is spaced from the ground surface, such that the pole extends through the openings in the upper and lower ends of the sleeve member, and the sleeve wall surrounds the pole with a space between the inner surface of the sleeve wall and the outer surface of the pole and with the outer surface of the sleeve wall facing outwardly of the pole;

attaching the sleeve member to the pole such that the sleeve member is fixed against longitudinal and rotational movement relative to the pole; and attaching a plurality of paper sheets containing public notices thereon at various locations on the outer surface of the sleeve wall, at least some of the sheets being attached by staples which penetrate through the sheets, through the sleeve wall, and into the space between the inner surface of the sleeve wall and the outer surface of the pole.

7. The method according to claim 6 wherein the sleeve wall is spaced from the pole by a plurality of projecting portions on the inner surface of the sleeve wall which engage the outer surface of the pole.

8. The method according to claim 7 wherein the projecting portions are formed by indents in the outer surface of the sleeve wall.

9. The method according to claim 8 wherein the indents define a plurality of rings surrounding the pole.

10. The method according to claim 7 wherein the projecting portions comprise a plurality of rings spaced longitudinally of the pole including a top ring, a bottom ring and at least one intermediate ring.

11. The method according to claim 10 wherein the top and bottom rings are formed by corresponding indentations in the outer surface of the sleeve wall and wherein the step of attaching the sleeve member to the pole comprises engaging a pair of bands around the sleeve member and within the indentations to clamp the sleeve member to the outer surface of the pole.

12. The method according to claim 11 wherein the upper and lower ends of the sleeve member are each formed with an in turned edge flange extending from a position spaced outwardly of the pole to a position immediately adjacent the outside surface of the pole.

13. The method according to claim 7 wherein the projecting portions comprise a plurality of rings spaced longitudinally of the pole including a top ring, a bottom ring and at least one intermediate ring, wherein the top and bottom rings are formed by indentations in the outer surface of the sleeve wall, and wherein the step of attaching the sleeve member to the pole comprises engaging a pair of bands around the sleeve member and within the indentations to clamp the sleeve member to the outer surface of the pole, each end of the sleeve member including an in turned edge flange extending from a position spaced outwardly of the pole to a position immediately adjacent the outside surface of the pole, a first annular rib extending from the in turned edge flange to an adjacent indentation within which a band is arranged, and a second annular rib extending from an opposed side of the indentation to a main wall portion of the sleeve member.

14. A method of displaying public notices comprising:

providing a pole mounted on a ground surface and extending upwardly therefrom, the pole having an outer surface;

providing a generally cylindrical, substantially rigid, molded plastic sleeve member including an upper end, a lower end, and a sleeve wall having an inner surface and an outer surface, the sleeve member being slit longitudinally so as to allow the sleeve member to be opened at the slit, the upper and lower ends each having an opening therein to allow passage of the pole therethrough;

opening the sleeve member at the slit;

placing the sleeve member around the pole with the lower end thereof at a height which is spaced from the ground surface, such that the pole extends through the openings in the upper and lower ends of the sleeve member, and the sleeve wall surrounds the pole with the outer surface thereof facing outwardly of the pole;

attaching the sleeve member to the pole by engaging a plurality of bands around the sleeve member to clamp the sleeve member to the pole such that the sleeve member is fixed against longitudinal and rotational movement relative to the pole; and attaching a plurality of paper sheets containing public notices thereon at various locations on the outer surface of the sleeve wall, at least some of the sheets being attached by staples which penetrate through the sheets and into the sleeve wall.

15. The method according to claim 14 including spacing the inner surface of the sleeve wall from the outer surface of the pole to define a space therebetween such that the staples penetrate through the sleeve wall into the space.

16. The method according to claim 15 wherein the inner surface of the sleeve wall is spaced from the outer surface of the pole by a plurality of projecting rings on the inner surface of the sleeve wall engaging and surrounding the outer surface of the pole at spaced positions therealong, the projecting rings being formed by indentations in the outer surface of the sleeve wall, and each of the bands being engaged within a respective one of the indentations.

* * * * *